(12) United States Patent
Purushothaman et al.

(10) Patent No.: US 10,020,990 B2
(45) Date of Patent: Jul. 10, 2018

(54) NETWORK STABILITY RECONNAISANCE TOOL

(71) Applicant: Bank of America Corporation, Charlotte, NC (US)

(72) Inventors: Sasidhar Purushothaman, Hyderabad (IN); Mohammed Tabrez, Hyderabad (IN); Mohideen Basha, Chennai (IN); Santhosh Rangadass, Puducherry (IN); Debasis Mishra, Hyderabad (IN); Mathavi Natarajan, Chennai (IN); Ambrish Tripathi, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 216 days.

(21) Appl. No.: 14/996,334

(22) Filed: Jan. 15, 2016

(65) Prior Publication Data
US 2017/0207962 A1    Jul. 20, 2017

(51) Int. Cl.
| | |
|---|---|
| *H04L 12/26* | (2006.01) |
| *H04L 12/24* | (2006.01) |
| *G06F 17/30* | (2006.01) |
| *H04L 12/733* | (2013.01) |
| *H04L 12/803* | (2013.01) |
| *H04L 29/06* | (2006.01) |

(52) U.S. Cl.
CPC .... *H04L 41/0813* (2013.01); *G06F 17/30979* (2013.01); *H04L 43/04* (2013.01); *H04L 43/10* (2013.01); *H04L 45/20* (2013.01); *H04L 47/125* (2013.01); *H04L 63/02* (2013.01); *H04L 63/20* (2013.01)

(58) Field of Classification Search
CPC ..... H04L 41/0813; H04L 43/10; H04L 43/04; H04L 63/02; H04L 63/20; G06F 1/30979
See application file for complete search history.

(56) References Cited

U.S. PATENT DOCUMENTS

| | | | |
|---|---|---|---|
| 6,654,914 B1 * | 11/2003 | Kaffine | H04L 41/0631 714/4.2 |
| 7,451,488 B2 | 11/2008 | Cooper et al. | |
| 7,827,261 B1 * | 11/2010 | Griswold, Jr. | G06F 15/16 709/223 |
| 8,286,248 B1 | 10/2012 | Oliphant et al. | |
| 8,601,586 B1 | 12/2013 | Boutros et al. | |

(Continued)

*Primary Examiner* — Scott B Christensen
(74) *Attorney, Agent, or Firm* — Weiss & Arons LLP; Michael A. Springs, Esq.

(57) ABSTRACT

Apparatus and methods for monitoring a remote network segment. The apparatus may perform, and the methods (apparatus and methods, collectively, "the methods") may include installing, on a remote segment of a packet switched network, a network component. The methods may include transmitting to the remote segment, from a transmitter on a local segment of the network a probe packet. The methods may include receiving from a receiver on the local segment a responsive packet that is responsive to the probe packet. The methods may include reconfiguring, in response to the responsive packet and diagnostic rules, a network-monitoring machine to recognize the network component. The reconfiguring may be a reconfiguring that is not responsive to a discovery signal that is (a) triggered by a process internal to the network component; and (b) transmitted by the network component.

16 Claims, 5 Drawing Sheets

(56) References Cited

U.S. PATENT DOCUMENTS

2003/0105838 A1* 6/2003 Presley .............. H04L 41/0266
　　　　　　　　　　　　　　　　　　　709/220
2003/0236875 A1* 12/2003 Green ................ H04L 41/0873
　　　　　　　　　　　　　　　　　　　709/224
2005/0069136 A1* 3/2005 Thornton ........... H04L 63/0823
　　　　　　　　　　　　　　　　　　　380/277

* cited by examiner

NETWORK STABILITY RECONNAISANCE TOOL

FIELD OF TECHNOLOGY

Aspects of the invention relate to stabilization of device networks.

BACKGROUND

Large server networks often require centralized process monitoring by a central console. Changes in network components that take place remote from the central console can introduce instability into the network. The changes can also undermine network security. The changes may be hardware changes or software changes. Even small changes, like model or version changes can affect stability or security. It is accepted that the changes may take place without affirmatively notifying the central console. It is therefore left to console monitoring processes to identify and respond to the changes to maintain stability and security.

Some monitoring processes involve exhaustively monitoring network traffic to identify anomalous data packets. Such monitoring is processor intensive. The more exhaustive the monitoring, the more network performance may be compromised.

Some monitoring processes involve inventorying network components and monitoring the known network components for changes in behavior. Such processes cannot adapt to addition or removal of network components.

Typically, there is a lack of methodical evaluation of stability- and security-consequences of adding or removing a network component.

It would therefore be desirable to provide apparatus and methods for identifying changes in network components on remote network segments without sacrificing network performance.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
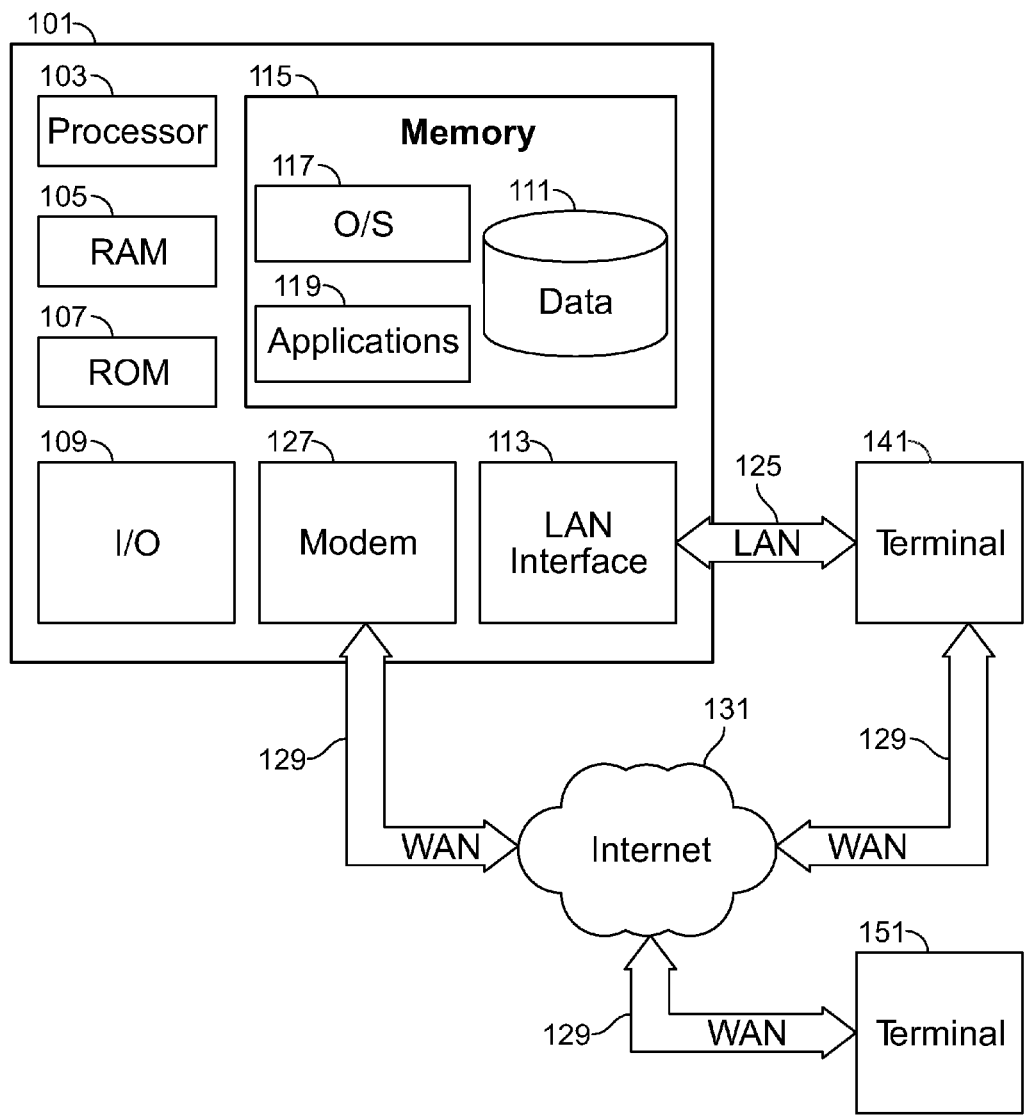
FIG. 1 shows illustrative apparatus in accordance with principles of the invention.

Apparatus and methods for monitoring a remote network segment are provided. The apparatus may perform, and the methods (apparatus and methods, collectively, "the methods") may include installing, on a remote segment of a packet switched network, a network component. The network component may include hardware. The network component may include software. The network component may include only hardware. The network component may include only software. The network component may be configured to interface with the remote segment.

The methods may include transmitting to the remote segment, from a transmitter on a local segment of the network a probe packet. The remote segment may be a first segment of the network. The local segment may be a second segment of the network. "Local" may imply, relative to "remote," a lesser distance from the transmitter. "Remote" may imply, relative to "local," a greater distance from the transmitter. "Distance" may be a term of physical distance, network topological distance, network architectural distance, distance along a sequence of steps in a process, latency, number of intermediate communication nodes, time required for communication, or any other suitable distance.

The methods may include receiving from a receiver on the local segment a responsive packet that is responsive to the probe packet.

The methods may include reconfiguring, in response to the responsive packet and diagnostic rules, a network-monitoring machine to recognize the network component.

The reconfiguring may be a reconfiguring that is not responsive to a discovery signal that is (a) triggered by a process internal to the network component; and (b) transmitted by the network component. The reconfiguring may be a reconfiguring that is responsive only to the responsive packet and the diagnostic rules.

The methods may include performing one or more of the following actions in response to receiving the responsive packet: (a) selecting a query; (b) transmitting to the remote segment the query in a query packet; (c) receiving return data in a return packet that is responsive to the query packet; (d) applying to the return data a diagnostic rule of the diagnostic rules; (e) determining based on the rule whether an identity of the network component is indicated; and (f) repeating a-e until the identity is indicated.

The query may be defined within a network monitoring probe. Table 1 lists illustrative probes.

TABLE 1

| Illustrative probes. |
|---|
| Illustrative probes |
| Ping |
| FTP port probe |
| TELNET |
| HTTP PROBE |
| SMTP PROBE |
| SFTP PROBE |
| MS Networking (SMB) |
| Oracle (e.g., SQL query) |
| VoIP |
| HTTP |
| Citrix |
| SQL |
| MS Exchange |
| POP3 |
| SNMP |

A network monitoring probe may include one or more queries. The query may be configured to cause a remote device or application to generate the return packet. The return packet may include the return data. The return data may indicate a value of an attribute of the network component. Table 2 lists illustrative attributes along with illustrative values that the attributes may have and that may be indicated by the return data.

TABLE 2

Illustrative attributes along with illustrative values
that the attributes may have and that may be indicated
by the return data.

| Illustrative Attribute | Illustrative attribute value |
|---|---|
| Status | ONLINE |
| | OFFLINE |
| | STANDBY |
| Version | Version number |
| | Version date |
| IP address | Local IP address |
| Virtual LAN address | Virtual LAN address |
| Maximum throughput rate | |

| Frame Part (MAC) | Minimum Size | Maximum Frame Size |
|---|---|---|
| Source Address | 6 bytes | 6 bytes |
| Destination Address | 6 bytes | 6 bytes |
| Payload (Network PDU) | 46 bytes | 1500 bytes |
| Type (or length) | 2 bytes | 2 bytes |
| Check Sequence (CRC) | 4 bytes | 4 bytes |
| Total Frame Physical Size | 84 bytes | 1538 bytes |

| Clock value | Time |
|---|---|
| | Date |
| Data format configuration setting | FTP example: ftp://username:password@hostname/path/filename |
| | HTTP example: http://username:password@hostname/path/filename |
| | Value: 'Array'|'Structure'|'StructureWithTime'|'Dataset' |
| | ICMP Probe |
| | probe icmp probe1\|interval 10\|passdetect interval 10\| passdetect count 3 |
| | forks = 5\|offset = 50%\|packetsize = 100\|step = 300\|timeout = 15\| |
| | probe http site1\|interval 2\|faildetect 1000\|passdetect interval 2\|passdetect count1 header Host header-value www.example.com\|expect status 200 200probe http site2\|interval 2 |
| | faildetect 1000\|passdetect interval 2\|passdetect count 1\|header Host header-value www.site2.com\|expect status 200 200\|probe http UAT-site-Http\|interval 20\|faildetect 3passdetect interval 120\|expect status 200 200 |

The query packet may be a packet that is compliant with the requirements of IEEE Standard 802.3 or 802.11 or derivatives thereof or any other Ethernet related standard or schema or any other suitable packet type.

The methods may include adding to a library one or more of the identity, each query and return data that correspond to the query.

The methods may include selecting a monitoring probe based on the return data; setting an alarm value corresponding to the monitoring probe; and scheduling a future transmission of the monitoring probe. The selecting may be based on the indication of the network component identity. Once the network component is identified, a processor may determine a network stability or network security issue that is known to be associated with the network component. The processor may determine the issue using a look-up table, a knowledgebase, the machine or any other suitable method.

The methods may include calculating a round trip time lapse between the transmitting and the receiving; and comparing the round trip time lapse to a threshold duration. The threshold duration may be a historical duration. If the time lapse is greater than the historical duration, the machine may conclude that the network component has been added. For example, the transmitter may transmit to a web server on the remote segment a web server request in a query packet having a 100 KB payload. If the round trip time lapse, say 7 microsecond, is greater than a 5 microsecond historically observed time lapse for a 100 KB payload request to the same server, the machine may conclude that there was an installation of an additional or a slower load balancer on the remote segment.

The load balancer may be installed between a web server on the remote segment and an application server on the remote segment. A firewall may intervene between the local segment and the remote segment.

The probe packet may include in a header a unique identification label; the unique identification label may be copied into the responsive packet; and the calculating may require determining that both the probe packet and the responsive packet include the unique identification label. The unique identification label may be used to ascertain that the return packet was sent in response to the query packet to facilitate the round trip time calculation. The query probe may include or be based on a ping probe.

The methods may include performing one or more of the following actions in response to receiving the responsive packet: (a) selecting a query that corresponds to the time lapse exceeding the historical duration; (b) transmitting to the remote segment the query in a query packet; (c) receiving return data in a return packet that is responsive to the query packet; (d) applying to the return data a diagnostic rule of the diagnostic rules; (e) determining based on the rule whether an identity of the network component is indicated; and (f) repeating a-e until the identity is indicated. The machine may determine that the network component includes a load balancer by following steps a-f.

The probe packet may include a port designation; and a service request. The port designation may be a custom port designation. The port designation may be a standard port designation. The service request may correspond to the type of service that is rendered at the designated port.

Table 3 shows illustrative port designations and corresponding service types.

TABLE 3

Illustrative port designations and corresponding service types.

| Port No. | Service Name | Official/Custom |
|---|---|---|
| 8080 | Application Monitoring (App specific) | Custom |
| 1918 | ITM Monitoring | Custom |
| 4899 | Radmin | Custom |
| 18 | Message Send Protocol (MSP) | Custom |
| 20 | FTP -- Data | Official |
| 22 | SSH Remote Login Protocol | Official |
| 23 | Telnet | Official |
| 25 | Simple Mail Transfer Protocol (SMTP) | Official |
| 53 | Domain Name System (DNS) | Official |
| 80 | HTTP | Official |
| 110 | POP3 | Official |
| 115 | Simple File Transfer Protocol (SFTP) | Official |
| 118 | SQL Services | Official |
| 156 | SQL Server | Official |
| 161 | SNMP | Official |
| 389 | Lightweight Directory Access Protocol (LDAP) | Official |
| 396 | Novell Netware over IP | Custom |
| 443 | HTTPS | Official |
| 445 | Microsoft-DS | Custom |
| 546 | DHCP Client | Official |
| 563 | SNEWS | Custom |
| 569 | MSN | Custom |
| 1080 | Socks | Official |

The methods may include performing one or more of the following actions in response to receiving the responsive packet: (a) selecting a query that corresponds to an application server message; (b) transmitting to the remote segment the query in a query packet; (c) receiving return data in a return packet that is responsive to the query packet; (d) applying to the return data a diagnostic rule of the diagnostic rules; (e) determining based on the rule whether an identity of the network component is indicated; and (f) repeating a-e until the identity is indicated.

The network component may include application request-processing code. The machine may determine that the network component includes application request-processing code by following steps a-f.

The methods may include performing one or more of the following actions in response to receiving the responsive packet: (a) selecting a query that corresponds to a file store address; (b) transmitting to the remote segment the query in a query packet; (c) receiving return data in a return packet that is responsive to the query packet; (d) applying to the return data a diagnostic rule of the diagnostic rules; (e) determining based on the rule whether an identity of the network component is indicated; and (f) repeating a-e until the identity is indicated.

The network component may include a backend file store. The machine may determine that the network component includes a backend file by following steps a-f.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a computing device 101 (alternatively referred to herein as a "server or computer") that may be used according to an illustrative embodiment of the invention. The computer server 101 may have a processor 103 for controlling overall operation of the server and its associated components, including RAM 105, ROM 107, input/output ("I/O") module 109, and memory 115.

I/O module 109 may include a microphone, keypad, touch screen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database 111. Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that may be used to create or execute probes, execute queries, record responses, look up security standards, edit query scripts, execute query scripts, execute diagnostic logic and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
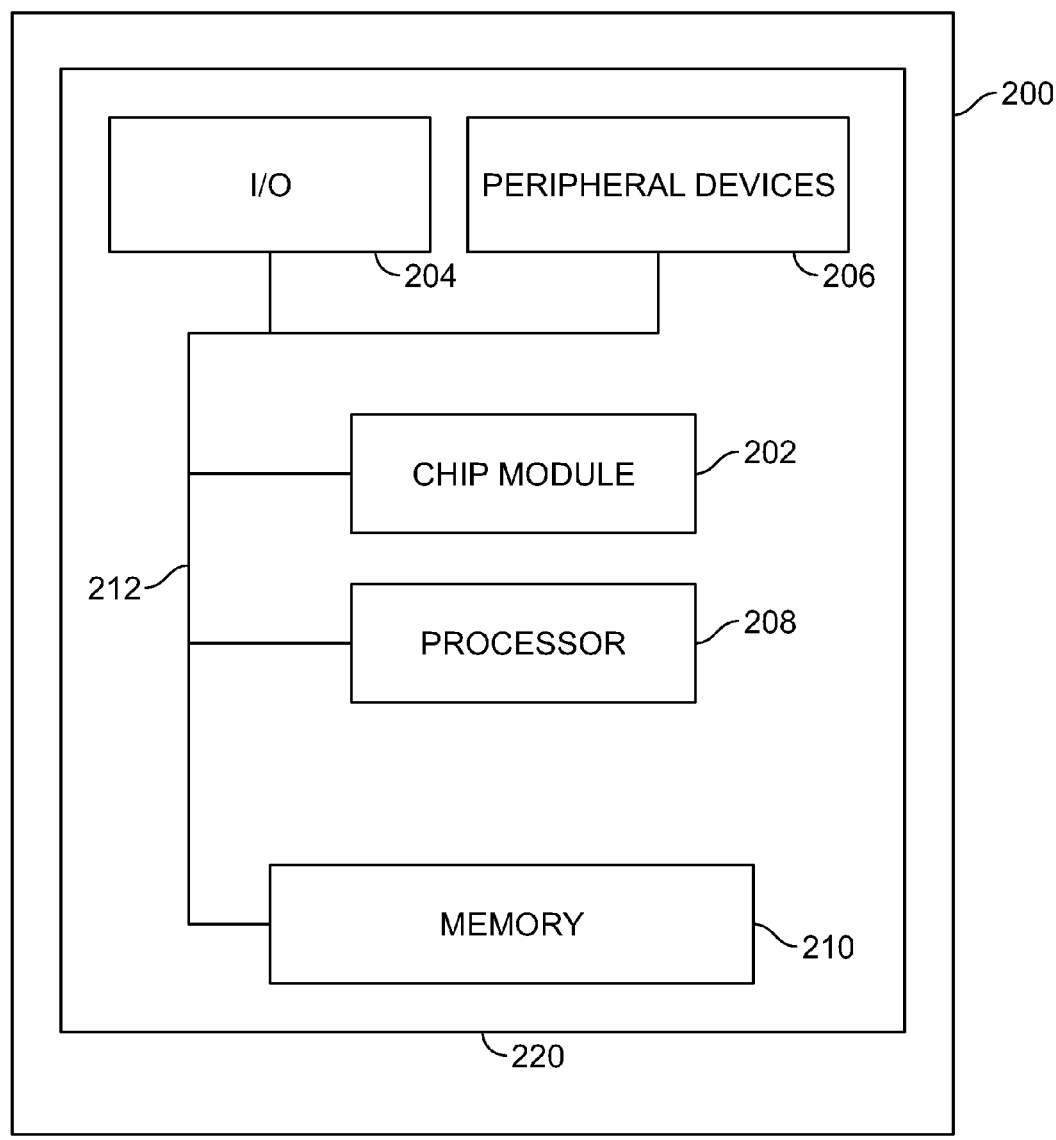
FIG. 2 shows illustrative apparatus in accordance with principles of the invention.

FIG. 2 shows an illustrative apparatus 200 that may be configured in accordance with the principles of the invention. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may compute data structural information, structural parameters of the data, quantify indices; and machine-readable memory 210.

Machine-readable memory 210 may be configured to store in machine-readable data structures: exception reports, rules tables, lexical items tables, computer code and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
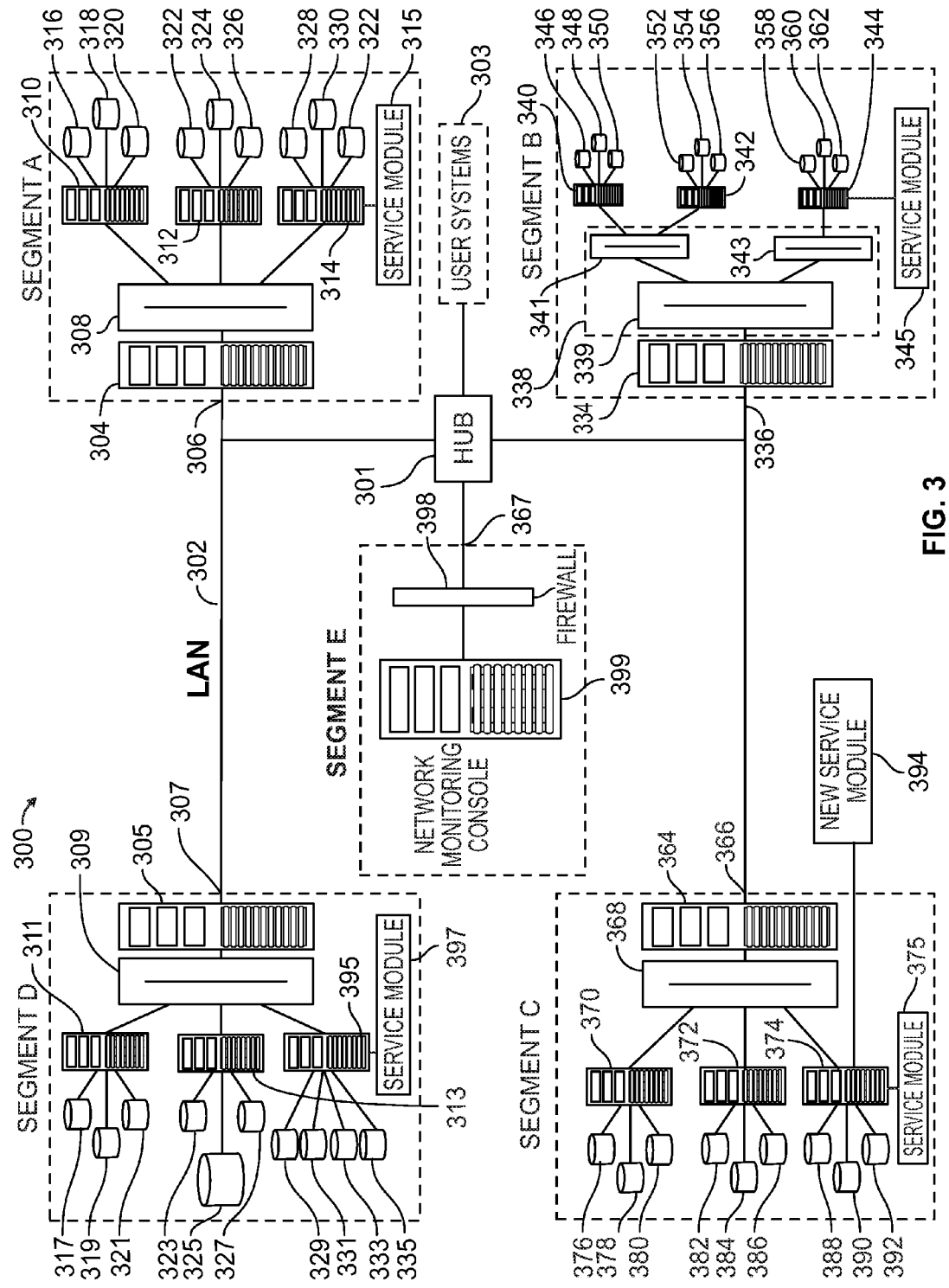
FIG. 3 shows illustrative apparatus in accordance with principles of the invention.

FIG. 3 shows illustrative arrangement 300 of network segments A-E arranged in communication with LAN 302. Arrangement 300 may include one or more network components. The network components may include one or more of the devices shown or described in connection with FIGS. 1 and 2. LAN 302 may include hub 301. Hub 301 may be in communication with user systems 303 and one or more of Segments A-E.

Segment A may include HTML server 304 at interface 306 with LAN 302. HTML server 304 may pass a request for information to load balancer 308. Load balancer 308 may route the request to one or more of application servers 310, 312 and 314. Application server 310, in response to the request, may retrieve data from one or more of databases 316, 318 and 320. Application server 312, in response to the request, may retrieve data from one or more of databases 322, 324 and 326. Application server 314, in response to the request, may retrieve data from one or more of databases 328, 330 and 332. Applications servers 310, 312 and 314 may run one or more application server modules. For example, application server 314 may run service module 315.

Segment A schematically illustrates a historical server cluster or a "reference" server cluster. Segments B, C and D have differences relative to Segment A. The differences could be from changes over time (and, thus, Segment A may be thought of as a historical server cluster). The differences may be contemporaneous and occur on different segments of arrangement 300.

The apparatus and methods may be used to scan Segment A from Segment E at a certain time. At a later time, Segment A may be rescanned. During the rescan, different network components may be identified based on differences between the scan later and earlier results. The different network components may be represented by the illustrative differences between the network components of Segments B, C and D and the network components of Segment A, which may be thought of as the historical or reference segment.

The apparatus and methods may be used to scan Segments A, B, C and D from Segment E generally contemporaneously. At different network components may be identified based on differences between the scans of the different Segments. The different network components may be represented by the illustrative differences between the network components of Segments B, C and D and the network components of Segment A, which may be thought of as the reference segment.

Segment B may include HTML server 334 at interface 336 with LAN 330. HTML server 334 may pass a request for information to load balancing complex 338. Load balancing complex may include load balancers 339, 341 and 343. Segment B may thus have load balancing network components that are different from or additional to the reference server cluster. Load balancing complex 338 may route the request to one or more of application servers 340, 342 and 344. Application server 340, in response to the request, may retrieve data from one or more of databases 346, 348 and 350. Application server 342, in response to the request, may retrieve data from one or more of databases 352, 354 and 356. Application server 344, in response to the request, may retrieve data from one or more of databases 358, 360 and 362. Applications servers 340, 342 and 344 may run one or more application server modules. For example, application server 344 may run service module 345.

Segment B schematically illustrates a server cluster in which a load balancing network component that is different from the load balancing network component in Segment A is present.

Segment C may include HTML server 364 at interface 366 with LAN 360. HTML server 364 may pass a request for information to load balancer 368. Load balancer 368 may route the request to one or more of application servers 370, 372 and 374. Application server 370, in response to the request, may retrieve data from one or more of databases 376, 378 and 380. Application server 372, in response to the request, may retrieve data from one or more of databases 382, 384 and 386. Application server 374, in response to the request, may retrieve data from one or more of databases 388, 390 and 392. Applications servers 370, 372 and 374 may run one or more application server modules. For example, application server 374 may run service module 375. Application server 374 may also run new service module 394.

Segment C schematically illustrates a server cluster in which a software service module network component that is different from the software service module network component in Segment A is present.

Segment D may include HTML server 305 at interface 306 with LAN 300. HTML server 305 may pass a request for information to load balancer 309. Load balancer 309 may route the request to one or more of application servers 311, 313 and 395. Application server 311, in response to the request, may retrieve data from one or more of databases 317, 319 and 321. Application server 313, in response to the request, may retrieve data from one or more of databases 323, 325 and 327. Database 327 includes file stores that are not present in databases 323 and 325. Application server 395, in response to the request, may retrieve data from one or more of databases 329, 331, 332 and 335. Database 335 is an additional database. Applications servers 311, 313 and 395 may run one or more application server modules. For example, application server 395 may run service module 397.

Segment D schematically illustrates a server cluster in which file stores such as those in database 325 and 335 are network components that are different from the network components present in Segment A.

Segment E may be in communication with LAN 302 via interface 367. Segment E may include firewall 398. Segment E may include network monitoring console 399. Segment E may be the local segment. Any of segments A, B, C and D may be the remote segment. Network monitoring console 399 may perform one or more of the selecting, transmitting, receiving, applying, determining, and repeating.

Figure 4:
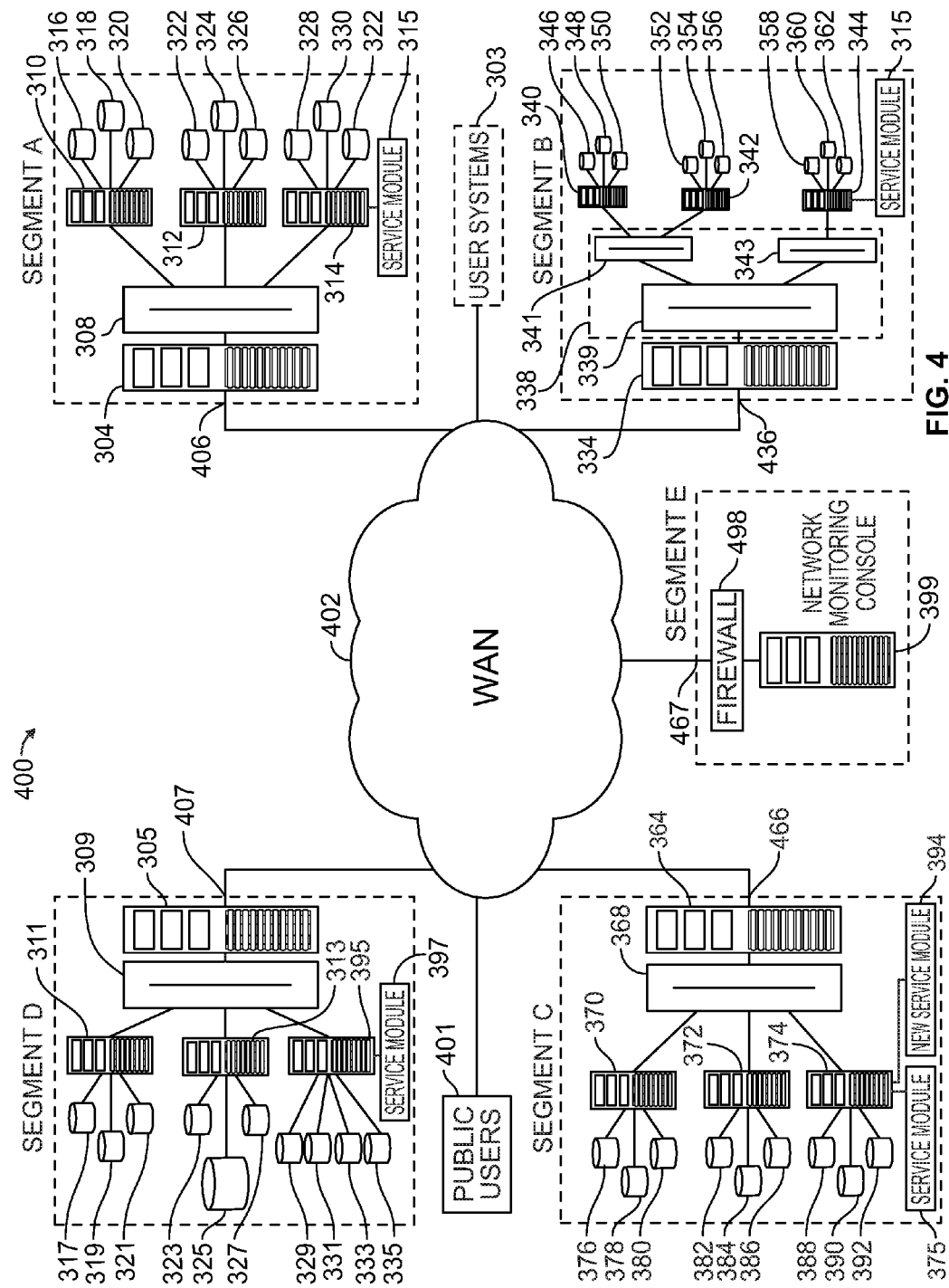
FIG. 4 shows illustrative apparatus in accordance with principles of the invention.

FIG. 4 shows illustrative arrangement 400 of network segments A-E arranged in communication with WAN 402. Arrangement 400 may include one or more network components. The network components may include one or more of the devices shown or described in connection with FIGS. 1 and 2. WAN 402 may be in communication with one or more of user systems 303, public users 401 and one or more of Segments A-E.

Segments A-E can thus be in communication with WAN 402 via, respectively, interfaces 406, 436, 466, 407 and 467. One or more of HTML servers 304, 334, 368 and 305 may be configured as web servers.

Segment E may include firewall 498, which may be situated between network monitoring console 399 and WAN 402. Otherwise some or all of the elements of Segments A-E may be included in arrangement 400 and communicate over WAN 402.

Figure 5:
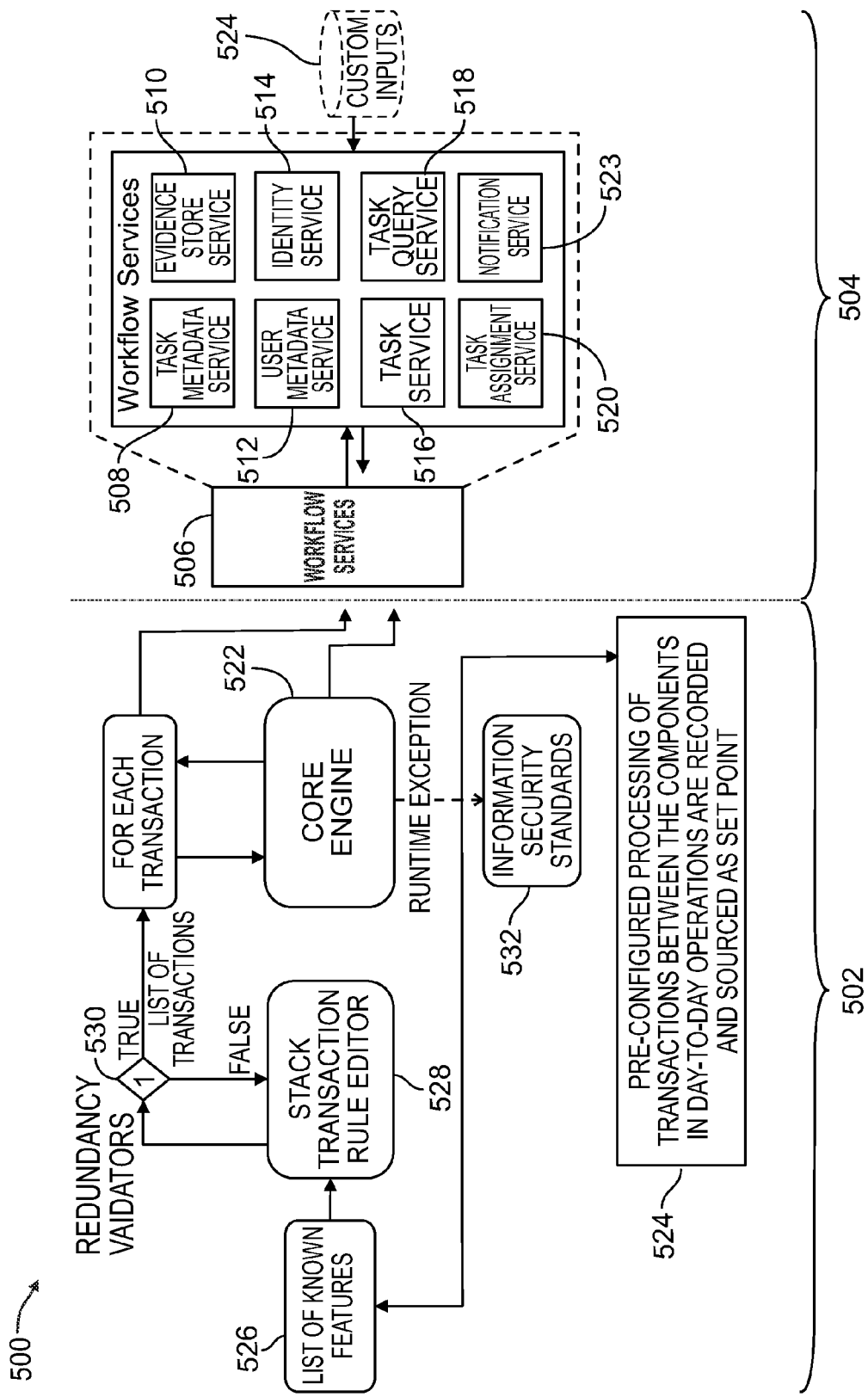
FIG. 5 shows a data flow in accordance with principles of the invention.

FIG. 5 shows illustrative data flow 500. Core engine may generate the probes that are transmitted from local network segment 502 to remote network segment 504.

Functions performed in local segment 502 may be performed, for example, on network console 399 (shown in FIGS. 3 and 4). Workflow services 506 may include some or all of the services offered by the application servers in Segments A-D. The workflow services may include one or more of task metadata services 508, evidence store service 510, user metadata service 512, identity service 514, task service 516, task query service 518, task assignment service 520, notification service 523 or any other suitable services.

Table 4 shows illustrative examples of the types of services in workflow services 506.

TABLE 4

Illustrative examples of the types of services in workflow services 506.

| Element of Workflow Services 506 | Type of service | Function |
| --- | --- | --- |
| Task metadata services 508 | List/DB of types of Services | "Application Procedural call" response service |

TABLE 4-continued

Illustrative examples of the types of services in workflow services 506.

| Element of Workflow Services 506 | Type of service | Function |
| --- | --- | --- |
| Evidence store service 510 | Symptoms & behaviors (evidences) listing of services | Response Interpretation listing responses |
| User metadata service 512 | Identity mapping of the Service accounts & Grouping | Remote Procedural call for the access privileges of the service account |
| Identity service 514 | Authorization details for the identified grouping | Mapping and computation of the access privileges & restrictions dynamically |
| Task service 516 | Purpose and details of the each of the services | Service execution based on the inputs given |
| Task query service 518 | Identifying the respective tasks | Iterative querying to pick the task |
| Task assignment service 520 | Invoke the respective assignment engine | Dynamically assign and build the computation logic for the assigned service |
| Notification service 523 | Notification engine | Centralized dispatching of the notification based on the distribution listing. |

Custom inputs 524, such as WEBDAV or any suitable utility or service for file transfer over the terminal session, whether enabled-on-demand or otherwise, may be provided.

Functions performed in remote segment 504 may be performed, for example, by the hardware included in one or more of Segments A-D (shown in FIGS. 3 and 4).

Core engine 522 may be configured to generate the probe, transmit to remote segment 504 the probe packet and receive from remote segment 504 the responsive packet.

Core engine 522 may scan through the new components of infrastructure and features added to the environment and validate if there are any potential vulnerabilities introduced to the system as per the latest security standards. For example, core engine 522 may perform iterative validations through XML queries using web services.

Core engine 522 may detect if such an application introduces potential vulnerabilities to the system based on a set of policy-based rules in stack transaction rule editor 528.

Core engine 522 may determine if additional monitoring for the type of request is required to cover the new network component. Core engine 522 may then add monitoring for other similar types of transactions that may also rely on the new network component.

Core engine 522 may perform one or more of logical evaluation of transactions; determination of whether a transaction is a known transaction; process matching (logic to track process execution, workflow or transactions to detect activities that heretofore were not known to be installed or enabled on the network, including infrastructure workflow processes, automated, rule-based and scheduled execution and matching of imported transactions), generation of reports on workflows and audit logs (PDF, Excel, HTML), and along with error alerts and warnings.

The reports may provide single consolidated view of the transactions and any deviation from that of the standard defined ones, such as may be archived in list 526.

Core engine 522 may provide validation of additional transaction output for a client. Core engine 522 may provide automated dispatch of alerts after validation.

Library 524 may include a list of all network components that are present in remote segment 504 at a given time. At initialization, the set of network components identified in library 524 may be termed the "set point." The set point may be updated continuously. The set point may be sourced to list 526 for assembly of a list of known features. The set point may be sourced to core engine 522 for comparison against new diagnostic information returned from remote segment 504.

List 526 may identify all the known features of the network components. The features may be defined in terms of known responses to probes. Stack transaction rule editor 528 may store query scripts for probing remote segment 504. Stack transaction rule editor 528 may store logic for determining the presence in remote segment 504 of features that are not identified in list 526. Stack transaction rule editor 528 may store logic for determining the presence in remote segment 504 of network components that correspond to the features and are not identified in library 524. Stack transaction rule editor 528 may store logic for ascertaining the identity (for example, a network component name and version number) of the network component that is not identified in library 524.

Stack transaction editor 526 may operate on the individual transactions generated by the queries. When core engine 522 identifies a new transaction, it may be checked at decision point 530 for redundancy, meaning that it was already present in list 526. If the new transaction is not redundant, core engine can proceed to the next line of script from stack transaction editor 528 to further narrow down the possible identities of new network components. If core engine 522 receives from remote segment 504 a runtime error, the error may be trapped and compared to known information security standards in standards 532. Standards 532 may include a list of known responsive data, which may be received in a responsive packet, that signals a security breach or a network stability threat. Those standards may be sourced to stack transaction rule editor 528. Once such a standard is sourced to stack transaction rule editor 528, core engine 522 acts in a monitoring capacity. By iteratively processing the responsive probes and identifying new probe transactions, scanning for new network components and monitoring the stability or security of old network components may be integrated into the same scripts in stack transaction rule editor 528.

Stack transaction rule editor 528 may have a user interface that enables a system administrator to assign an appropriate transaction classification to a network component.

A transaction may be classified or differentiated from other transactions based on the layers it works on—e.g., whether the webserver layer, the application layer, the middleware layer or the operating system layer.

The scripts may define monitoring details. Stack transaction rule editor 528 may provide a user interface for iterative querying of delayed transactions.

Data extraction of output, on the "backend", from the scripts, of responsive packet data, transactions, transaction sequences, remote querying of TASK execution status service and the like may be performed using adapter types (database, Excel, Txt, XML).

New components, once identified, may be looked up in standards 532 to determine what responsive packets to obtain and monitor. Standards 532 may include a knowledge base that may be updated from time to time or on a regular basis.

Table 5 shows illustrative examples of probes and associated queries, responsive packet information and diagnostic logic that may be applied by core engine 522.

TABLE 5

Illustrative examples of probes and associated queries, responsive packet information and diagnostic logic that may be applied by core engine 522.

| Probe script | | Responsive packet | Diagnostic logic |
|---|---|---|---|
| Probe ("$P_x$") | Query ("$Q_y$") | Response ("$R_z$") | ANOMALOUS? |
| X = 1<br>Remotely query agent status | Y = 1<br>Ping status | Z = 1<br>Responds to ping within predetermined acceptable time limits<br>Proceed to Probe 2 (X = 2) | NO (continue script) |
| | | Z = 2<br>Does NOT Respond to ping within predetermined acceptable time limits | YES (Invoke the "Remote agent restart script) |
| | | Z = 3<br>No response | YES (Invoke "Remote agent restart script) |
| | Y = 2<br>Invoke Remote Agent restart script | Z = 1<br>Remote Agent restarted successfully and responding to ping | NO (continue script) |
| | | Z = 2<br>Remote agent restarted but still not responding to the ping | YES<br>2(a) (invoke the server restart script (Non-prod))<br>2(b) (if remote agent still doesn't respond to ping, invoke agent restart at console) |
| X = 2<br>Remote query of agent health and functionality | Y = 1<br>Invoke Remote Agent Functionality validator | Z = 1<br>Iterative check results indicates the health behavior of the agent | NO (continue script) |
| | | Z = 2<br>Failure manifests during iterative querying | YES (Invoke relevant query scripts based on failure codes that are output-some or all codes indicating stage of failure) |
| X = 3<br>Read Error code identifier and corresponding comment picker (e.g., error code 203) | | Z = 1<br>Error code 203 indicates access denied (exception error)captured at previous stage | YES (The respective script will be triggered) |
| | | Z = 2<br>The error code identifier not being able to pick the comments from that of the available known errors | YES (The access denied issue will pull out the relevant comments and display for engineers to troubleshoot) |

TABLE 5-continued

Illustrative examples of probes and associated queries, responsive packet information and diagnostic logic that may be applied by core engine 522.

| Probe ("P$_x$") | Probe script Query ("Q$_y$") | Responsive packet Response ("R$_z$") | Diagnostic logic ANOMALOUS? |
|---|---|---|---|
| | | Z = 3 Error code lacks relevant comments | YES (Flag exception and note for tool admin) |

Table 6 shows illustrative hypothesis about a new or different network component. The illustrative hypotheses are built into the stack transaction rule editor and form a logic tree that rules out network components that are known to already be present in the remote segment. The logic tree includes known responses of network components that are not yet known to have been added to the remote segment. The script therefore may rule out network components or network component hypotheses based on incongruity between responsive packet information and known responsive behavior of network components that are not known to have been installed on the remote segment.

TABLE 6

Illustrative hypothesis about a new or different network component.

| Probe (X) | Reaction (Z) | Illustrative hypothesis about new or different network component |
|---|---|---|
| Remote Services Probe | Unexpected Response/ Additional response | Custom (e.g., WEBDAV) component is running on the remote service/App/hw device |
| Content Querying Service | Additional Header strings received from the remote components | Indicates that configuration change on the existing components services |
| Packet Response Probe | Delayed response | Indicates that the functionality and features are added that impedes the response time |
| Security Audit probe | Availability of the new port (through @ firewall) | This indicates the possible opening of new ports known or unknown |
| Patch Validation probe | Missing patches identified | Known vulnerabilities yet to be sealed |
| Performance probe | Sluggishness in responding to voluminous requests | Coding/Functionality tweaking has to be performed. |

Thus, methods and apparatus for monitoring a remote network segment have been provided. Persons skilled in the art will appreciate that the present invention can be practiced by other than the described embodiments, which are presented for purposes of illustration rather than of limitation. The present invention is limited only by the claims that follow.

What is claimed is:

1. A method for monitoring a remote network segment, the method comprising:
   installing, on a remote segment of a packet switched network, a network component that is configured to interface with the remote segment;
   transmitting to the remote segment from a transmitter on a local segment of the network a probe packet;
   receiving from a receiver on the local segment a responsive packet that is responsive to the probe packet; and
   reconfiguring, in response to the responsive packet and diagnostic rules, a network-monitoring machine to recognize the network component by:
   calculating a round trip time lapse between the transmitting and the receiving;
   comparing the round trip time lapse to a historical duration;
   determining, based on the time lapse exceeding the historical duration, that the network component has been newly installed; and
   in response to the determining that the network component has been newly installed:
   (a) selecting a query;
   (b) transmitting to the remote segment the query in a query packet;
   (c) receiving return data in a return packet that is responsive to the query packet;
   (d) applying to the return data a diagnostic rule of the diagnostic rules;
   (e) determining based on the rule whether an identity of the network component is indicated; and
   (f) repeating a-e until the identity is indicated.

2. The method of claim 1 wherein the reconfiguring is not responsive to a discovery signal triggered by a process internal to the network component and transmitted by the network component.

3. The method of claim 2 wherein the reconfiguring is responsive only to the responsive packet and the diagnostic rules.

4. The method of claim 1 further comprising adding to a library:
   the identity;
   each query; and
   return data that correspond to the query.

5. The method of claim 1 further comprising:
   selecting a monitoring probe based on the return data;
   setting an alarm value corresponding to the monitoring probe; and
   scheduling a future transmission of the monitoring probe.

6. The method of claim 1 wherein:
   the probe packet includes in a header a unique identification label;
   the unique identification label is copied into the responsive packet; and
   the calculating requires determining that both the probe packet and the responsive packet include the unique identification label.

7. The method of claim 1 wherein the query corresponds to the time lapse exceeding the historical duration.

8. The method of claim 1 wherein the network component includes a load balancing element.

9. The method of claim 1 wherein:
   the network component is installed between a web server on the remote segment and an application server; and
   a firewall intervenes between the local segment.

10. The method of claim 1 wherein the probe packet comprises:
    a port designation; and
    a service request.

11. The method of claim 1 wherein the query corresponds to an application server message.

12. The method of claim 11 wherein the network component includes application request-processing code.

13. The method of claim 1 wherein the query corresponds to a file store address.

14. The method of claim 12 wherein the network component includes a backend file store.

15. A method for monitoring a remote network segment, the method comprising:
 transmitting a probe jacket from a transmitter on a local segment of a packet switched network to a remote segment of the network;
 receiving from a receiver on the local segment a responsive packet that is responsive to the probe packet;
 calculating a round trip time lapse between the transmitting and receiving;
 comparing the round trip time lapse to a historical duration;
 determining, based on the time lapse exceeding the historical duration, that a network component has been newly installed on the remote segment; and
 in response to the determining that the network component has been newly installed:
  (a) selecting a query that corresponds to the time lapse exceeding the historical duration;
  (b) transmitting to the remote segment the query in a query packet;
  (c) receiving return data in a return packet that is responsive to the query packet;
  (d) applying to the return data at least one diagnostic rule;
  (e) determining based on the rule whether an identity of the network component is indicated; and
  (f) repeating a-e until the identity is indicated; and
 reconfiguring, in response to the responsive packet and diagnostic rules, a network-monitoring machine to recognize the network component.

16. A method for monitoring a remote network segment, the method comprising:
 installing, on a remote segment of a packet switched network, a network component that is configured to interface with the remote segment;
 transmitting to the remote segment from a transmitter on a local segment of the network a probe packet;
 receiving to the remote segment from a transmitter on a local segment of the network a probe packet;
 receiving from a receiver on the local segment a responsive packet that is responsive to the probe packet;
 reconfiguring, in response to the responsive packet and diagnostic rules, a network-monitoring machine to recognize the network component;
 calculating a round trip time lapse between the transmitting and the receiving;
 comparing the round trip time lapse to a historical duration;
 determining, based on the time lapse exceeding the historical duration, that the network component has been newly installed; and
 in response to the determining that the network component has been newly installed:
  (a) selecting a query that corresponds to at least one of:
   the time lapse exceeding the historical duration;
   an application server message;
   a file store address;
  (b) transmitting to the remote segment the query in a query packet;
  (c) receiving return data in a return packet that is responsive to the query packet;
  (d) applying to the return data a diagnostic rule of the diagnostic rules;
  (e) determining based on the rule whether an identity of the network component is indicated; and
  (f) repeating a-e until the identity is indicated.

\* \* \* \* \*